(12) United States Patent
Robichaud et al.

(10) Patent No.: US 10,689,548 B2
(45) Date of Patent: Jun. 23, 2020

(54) ELECTROSTATIC DISSIPATIVE SURFACE COATING AND HIGH TEMPERATURE LABEL EMPLOYING SAME

(71) Applicant: Polyonics, Inc., Westmoreland, NH (US)

(72) Inventors: Kenneth T. Robichaud, Swanzey, NH (US); Donald P. Nieratko, Hancock, NH (US); Delilah F. Adams, Keene, NH (US); Robert H. Guyette, Jr., Sullivan, NH (US)

(73) Assignee: Polyonics, Inc., Westmoreland, NH (US)

(*) Notice: Subject to any disclaimer, the term of this patent is extended or adjusted under 35 U.S.C. 154(b) by 174 days.

(21) Appl. No.: 15/873,534

(22) Filed: Jan. 17, 2018

(65) Prior Publication Data

US 2018/0208801 A1 Jul. 26, 2018

Related U.S. Application Data

(60) Provisional application No. 62/448,650, filed on Jan. 20, 2017.

(51) Int. Cl.
| | | |
|---|---|---|
| *C09J 163/00* | (2006.01) | |
| *C09J 7/40* | (2018.01) | |
| *C09D 163/04* | (2006.01) | |
| *C09J 7/29* | (2018.01) | |
| *C08G 59/40* | (2006.01) | |
| *C09D 171/12* | (2006.01) | |
| *C09D 163/00* | (2006.01) | |
| *C08K 3/04* | (2006.01) | |

(52) U.S. Cl.
CPC .......... *C09J 7/401* (2018.01); *C08G 59/4028* (2013.01); *C09D 163/00* (2013.01); *C09D 163/04* (2013.01); *C09D 171/12* (2013.01); *C09J 7/29* (2018.01); *C08K 3/041* (2017.05); *C08K 2201/001* (2013.01); *C09J 2201/606* (2013.01); *C09J 2203/334* (2013.01); *C09J 2205/106* (2013.01); *C09J 2463/006* (2013.01); *C09J 2479/085* (2013.01); *C09J 2479/086* (2013.01)

(58) Field of Classification Search
None
See application file for complete search history.

(56) References Cited

U.S. PATENT DOCUMENTS

| | | | | |
|---|---|---|---|---|
| 2002/0183421 | A1* | 12/2002 | Kojima | C08K 9/04 523/400 |
| 2007/0213429 | A1* | 9/2007 | Cheng | C08G 59/24 523/458 |
| 2010/0170626 | A1* | 7/2010 | Lochtman | B05D 1/00 156/150 |
| 2012/0138868 | A1* | 6/2012 | Arifuku | B82Y 10/00 252/510 |
| 2012/0164900 | A1* | 6/2012 | Reichwein | B29C 70/443 442/1 |

OTHER PUBLICATIONS

Compound summary "Phenoxy", PubChem, retrieved on Sep. 26, 2019. (Year: 2019).*

* cited by examiner

*Primary Examiner* — Anish P Desai
(74) *Attorney, Agent, or Firm* — McLane Middleton, Professional Association

(57) ABSTRACT

An electrostatic dissipative coating composition comprises a phenoxy-epoxy resin system comprising from 40-80 parts by weight to 5-20 parts by weight of an epoxy resin. Carbon nanotubes are dispersed in the phenoxy-epoxy resin system. The coating composition includes at least one isocyanate crosslinking agent and at least one metal catalyst. In a further aspect, a label construction comprising the electrostatic dissipative coating composition is provided.

23 Claims, 1 Drawing Sheet

ELECTROSTATIC DISSIPATIVE SURFACE COATING AND HIGH TEMPERATURE LABEL EMPLOYING SAME

CROSS-REFERENCE TO RELATED APPLICATION

This application claims the priority benefit of U.S. provisional application No. 62/448,650 filed Jan. 20, 2017. The aforementioned application is incorporated herein by reference in its entirety.

FIELD OF THE DISCLOSURE

The present invention relates to antistatic labels and, in particular, to an improved antistatic surface coating composition for pressure sensitive adhesive labels and label facestock constructions and adhesive label constructions having a surface coating layer formed from such antistatic surface coating compositions. In certain embodiments, the surface coating compositions, facestock constructions, and adhesive labels in accordance with this disclosure may advantageously be used for high temperature label applications, such as automotive, aeronautic applications, and others, although it will be recognized that the adhesive label constructions herein may also be used for all other applications where a low voltage charged and discharged energy is desired, such as for printed circuit boards and other circuit substrates, electronic components, and other electric charge-sensitive areas.

BACKGROUND

Adhesive labels comprising a layer of facestock material backed by a layer of adhesive which, in turn, is covered by a release liner to protect the adhesive during storage, transport, handling, and application are generally known in the art. Antistatic labels having a facestock material comprising a polyimide film with an antistatic base coat are also known. However, such prior art label constructions have low durability and poor temperature resistance.

It is desirable to provide an antistatic surface coating composition and label facestock materials and label constructions employing same that provide excellent electrostatic dissipative properties with high durability. It is also desirable that the label facestock material and label constructions employing the antistatic surface coating composition be resistant to deterioration when used for high temperatures applications. It is also desirable that such label facestock materials and label constructions be printable with a variety of inks and using a variety of printing systems.

SUMMARY

In one aspect, an electrostatic dissipative coating composition comprises a phenoxy-epoxy resin system, the phenoxy-epoxy resin system comprising from 40 to 80 parts, by weight, of an epoxy resin and from 5 to 20 parts, by weight, of a phenoxy resin. Carbon nanotubes are dispersed in the phenoxy-epoxy resin system. The coating composition includes at least one isocyanate crosslinking agent and at least one metal catalyst.

In another aspect, an electrostatic dissipative label construction comprises a polymer film substrate having an upper surface and a lower surface and an electrostatic dissipative coating composition overlying the upper surface. The electrostatic dissipative coating composition comprises a phenoxy-epoxy resin system, the phenoxy-epoxy resin system comprising from 40 to 80 parts, by weight, of an epoxy resin and from 5 to 20 parts, by weight, of a phenoxy resin. The electrostatic dissipative coating composition further comprises carbon nanotubes dispersed in the phenoxy-epoxy resin system, at least one isocyanate crosslinking agent, and at least one metal catalyst.

In yet another aspect, an electrostatic dissipative label facestock construction is provided.

One advantage of the surface composition in accordance with the present disclosure is that, in certain embodiments, it has electrostatic discharge properties of $10^4$ to $10^9$ ohms at 12% relative humidity, as tested by surface resistivity: ANSI/ESD STM11.11>$104\Omega$ and <$109\Omega$ Tested at 23+/−3C and 12+/−3% RH.

Another advantage of the surface composition of the present disclosure is that, in certain embodiments, label constructions employing it have a low voltage charge of less than 30 volts on removal and application as tested by low charging surface, ANSI/ESD ADV11.2 under ANSI ESD 5541, EIA 625 & 541<50 volts per inch square.

Another advantage of the present development of the label constructions in accordance with this disclosure resides in their ability to resist degradation when exposed to high temperatures.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, which are not necessarily to scale, are only for purposes of illustrating preferred embodiments and are not to be construed as limiting the invention.

DETAILED DESCRIPTION OF THE PREFERRED EMBODIMENTS

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5). All percentages or ratios recited herein are by weight unless staged otherwise.

Figure 2:
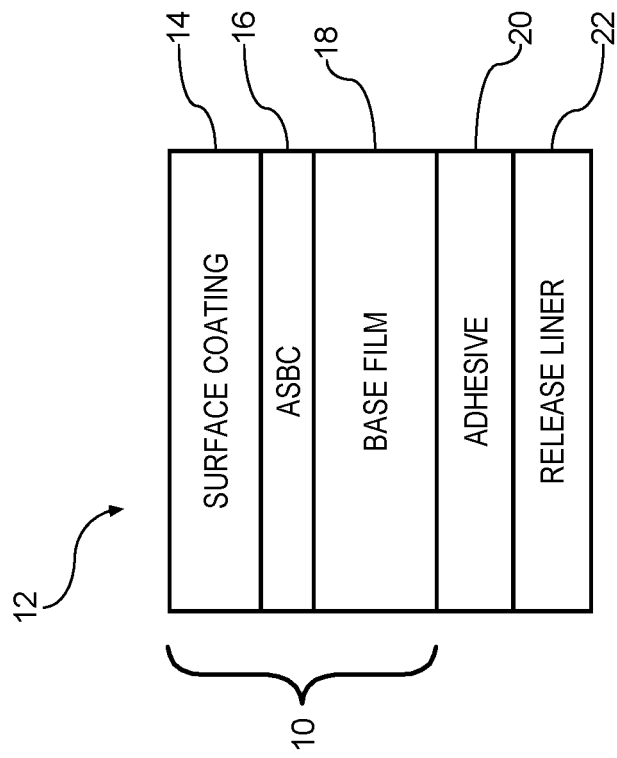
FIG. 2 is side view of a label construction comprising the label facestock of FIG. 1 backed by a layer of adhesive which, in turn, is covered by a release liner.
Figure 1:
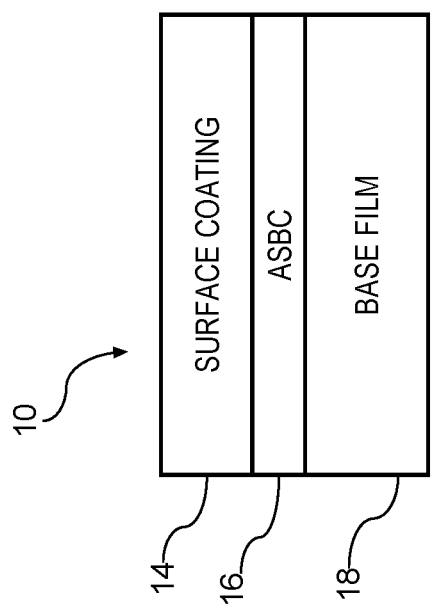
FIG. 1 is side view of a sheet of label facestock material having an electrostatic dissipative surface coating in accordance with a first exemplary embodiment of the present disclosure.

Unless specified otherwise, terms or orientation such as top, bottom, upper, lower, etc., refer to the orientation of FIGS. 1 and 2.

The terms "overlies," "overlying," and the like, when referring to the relationship of a first (or one) layer relative to a second (or another) layer, mean that, in a given orientation, the first layer partially or completely overlies the second layer. A first layer overlying a second layer may or may not be in contact with the second layer, e.g., one or more additional layers may be positioned between the first and the second layer. Similarly, the terms "underlies," "underlying," and the like, when referring to the relationship of a first (or one) layer relative to a second (or another) layer, mean that, in a given orientation, the first layer partially or completely underlies the second layer. A first layer underlying a second layer may or may not be in contact with the second layer, e.g., one or more additional layers may be positioned between the first and the second layer.

FIG. 1 illustrates an exemplary label facestock construction 10 comprising an antistatic surface coating layer 14 overlying a base film substrate 18. A prime layer 16 comprising an antistatic basecoat composition (ASBC) is disposed between the base film substrate 18 and the surface coating layer 14.

FIG. 2 illustrates an exemplary label construction 12 comprising the facestock construction 10, as shown and described above by way of reference to FIG. 1 and an adhesive coating layer 20 disposed on the opposite surface of the base film substrate 18, i.e., underlying the base film substrate 18. A release layer 22, such as a silicone or fluorosilicone treated release liner, is removably disposed over the exposed surface of the adhesive layer 22.

The electrostatic dissipative surface coating compositions for making the surface coating layer 14 of the present disclosure comprise a phenoxy-epoxy based resin system. In certain embodiments, the phenoxy-epoxy based resin system comprises from about 40 parts to about 80 parts, by weight, of an epoxy resin and from about 5 parts to about 20 parts, by weight, of a phenoxy resin.

In certain embodiments, the electrostatic dissipative surface coating compositions for making the surface coating layer 14 of the present disclosure comprise a phenoxy-epoxy based resin system comprising from about 40 parts to about 80 parts, by weight, of an epoxy resin and from about 5 parts to about 20 parts, by weight, of a phenoxy and epoxy resin mixture having a phenoxy to epoxy ratio on the range of from 5-15 to 1-10. In certain embodiments, the epoxy and phenoxy resins are polyether resins based on bisphenol-A and epichlorohydrin, as would be understood by persons skilled in the art.

The surface coating compositions of the present invention also comprise at least one isocyanate crosslinking agent and at least one metal catalyst. The isocyanate crosslinking agent(s) is present in an amount, which is effective for crosslinking the mixture of phenoxy and epoxy resins contained in the surface coating composition. In certain embodiments, the amount of isocyanate crosslinking agent(s) may vary from 1% to 5%, more preferably or from 2% to about 4%, by weight based on the total weight of the phenoxy and epoxy resins in the coating composition. In certain embodiments, the crosslinking agent(s) may be selected from the group consisting of 1,6-hexane di-isocyanate (HDI), toluene di-isocyanate (TDI), or the like, or combinations thereof.

In certain embodiments, the amount of metal catalyst may vary from 0.1% to 1.0%, or, more preferably, from 0.1% to about 1.0%, by weight based on the total weight of the phenoxy and epoxy resins in the coating composition. In certain embodiments, the metal catalyst(s) may be selected from the group consisting of dibutyltin dilaurate, DBTDL. Carbon nanotubes are dispersed in the phenoxy-epoxy resin system. The carbon nanotubes are made into a mixture using a suitable surfactant, preferably an anionic surfactant. In certain embodiments, the surfactant is a hydrophilic, dipolar pyrrolidone ring with a hydrophobic alkyl group. The carbon nanotubes are present in an amount which is effective for providing electrical conductivity or static dissipating properties to the surface coating composition. In certain embodiments, the amount of carbon nanotubes may vary from 0.1% to 4.0%, more preferably or from 0.25% to about 0.5%, by weight based on the total weight of the phenoxy and epoxy resins in the coating composition. In certain embodiments, the carbon nanotubes are single wall nanotubes. In certain embodiments, the carbon nanotubes are TUBALL™ carbon nanotubes available from OSiCAl Ltd. of London, England.

The surface coating compositions also contain one or more fillers, preferably an inorganic filler. The filler(s) is present in an amount which is effective to provide desired color and printability characteristics to the surface coating composition. In certain embodiments, the amount of filler(s) may vary from 30% to 50%, more preferably or from 32% to about 37%, by weight based on the total weight of the phenoxy and epoxy resins in the coating composition. In certain embodiments wherein a generally white label surface is desired, the filler is titanium dioxide, although other organic or inorganic fillers, such as silver nanowires, silver coated copper, copper, and copper coated spheres, or combinations thereof, can be utilized in addition to or as an alternative to titanium dioxide.

In certain embodiments where it is desired to impart a flat or matte finish to the surface coating composition 14, one or more additional fillers may be added to the surface coating composition. Such additional filler(s) may be present in an amount which is effective to provide the desired matte appearance to the surface coating composition. In certain embodiments, the amount of additional filler(s) may vary from 2% to 8%, more preferably or from 2.5% to about 4.5%, by weight based on the total weight of the phenoxy and epoxy resins in the coating composition. In certain embodiments, the additional filler is selected from untreated silica, treated silica, and combinations thereof, although other organic or inorganic fillers for imparting a matte finish to the surface coating layer can be utilized.

Example 1

Exemplary formulations for surface coating compositions providing a surface coating layer having a gloss finish appear in Table 1 below:

TABLE 1

| | |
|---|---|
| Epoxy resin | 5-20% by weight |
| Anionic dispersion aid | >1% by weight |
| Single Wall Carbon Nanotubes | >1% by weight |
| High molecular weight co-polymer dispersion aid | >5% by weight |
| Silane | >1% by weight |
| $TiO_2$ | 10-40% by weight |
| Phenoxy-Epoxy resin blend (90/10 weight ratio) | 40-80% by weight |
| Isocyanate crosslinker | >2% by weight |
| Polyol | >5% by weight |
| Polyether siloxane copolymer | >10% by weight |
| Dibutyltin dilaurate | >5% by weight |
| Aliphatic and Aromatic Solvents | 10-50% by weight |

Example 2

Exemplary formulations for surface coating compositions providing a surface coating layer having a gloss finish appear in Table 2 below:

TABLE 2

| | |
|---|---|
| Epoxy resin | 5-20% by weight |
| Anionic dispersion aid | >1% by weight |
| Single Wall Carbon Nanotubes | >1% by weight |
| High molecular weight co-polymer dispersion aid | >5% by weight |
| Silane | >1% by weight |

TABLE 2-continued

| | |
|---|---|
| TiO$_2$ | 10-40% by weight |
| Phenoxy-Epoxy resin blend (90/10 weight ratio) | 40-80% by weight |
| Isocyanate crosslinker | >2% by weight |
| Polyol | >5% by weight |
| Polyether siloxane copolymer | >10% by weight |
| Dibutyltin dilaurate | >5% by weight |
| Aliphatic and Aromatic Solvents | 10-50% by weight |
| Non-surface treated or treated silica | >5% by weight |

In the aforementioned Examples 1 and 2, the silane copolymer was prevalent in the application and surface treatment. The polyol component is a high molecular weight polyol which provides increased flexibility and printability of the surface. The dibutyltin dilaurate component is provided as a catalyst or crosslinking agent to complete the chemical bonding. Solvent dilution is by aliphatic and aromatic solvents for coating capabilities. The solvents provide surface leveling and substrate wetting.

In preferred embodiments, the base film layer comprises a polyimide film coated with an antistatic base coat. Exemplary polyimide film materials include DUPONT™ KAPTON® polyimide film, available from E. I. du Pont de Nemours and Company of Wilmington, Del. In certain embodiments, the base film layer has at thickness in the range of from 0.5 to 10 mils.

Exemplary antistatic base coat materials include conductive polymers such as polyelectrolyte poly(4-styrene sulfonate) (PSS), poly(3,4-ethylenedioxythiophene)/poly(4-styrene sulfonate) (PEDOT/PSS). The thickness of the antistatic base coat is <1 micron with a coating weight in the range of from 1 to 5 g/m$^2$. In certain embodiments, the antistatic base coat material may be a water-based PEDOT formulation with water-based polymer resin available from Hereaus Group of Hanau, Germany.

The adhesive layer 20 may comprise any suitable adhesive and may advantageously be a pressure sensitive adhesive composition as generally known to persons skilled in the art. In certain embodiments, the adhesive layer has at thickness in the range of from 0.5 to 5.0 mils. Pressure sensitive adhesives (PSA's) suitable for use in the label constructions of the present invention are commonly available and include, for example, acrylic based adhesives, polysiloxane-based adhesives, adhesives based on elastomers such as natural rubber or synthetic rubbers containing polymers or copolymers of styrene, butadiene, acrylonitrile, isoprene, isobutylene, and so forth. The adhesive layer may be directly coated on the lower surface of the film substrate using any suitable coating, or alternatively, the adhesive layer may be transferred from a liner, such as the release liner 22 or other liner supporting the adhesive layer 20.

The release liner 22 includes a liner substrate such as a paper, polymer film, or other suitable sheet of material. At least one of the major surfaces of the release liner, i.e., the release surface, is treated with a release agent, such as a silicone or fluorosilicone release agent to allow the release liner to preferentially separate from the adhesive layer.

The surface coating composition in accordance with this disclosure is manufactured using one or more solvents to provide a formulation having a desired solids and viscosity content so that it is can be applied to the base film as a thin film. Exemplary coating methods for applying the thin film to the base film layer gravure application (including reverse gravure, direct gravure, and offset gravure), although other coating techniques are contemplated, including wire rod, knife-over-roll, reverse roll, extrusion die, slot die, curtain coating techniques, and the like. The surface coating layer is then cured by thermoset conditions to dry and crosslink. The coated base film may be subjected to elevated temperature to accelerate the evaporation of the solvents and crosslinking. In certain embodiments, it has been found that coating at 200° C. for 90 seconds insures the reaction of the polymers and crosslink completion.

In certain embodiments, the surface coating composition is applied to yield a dry coat density of 18 to 30 g/m$^2$ based on the weight of the cured and dried surface coating layer.

The following example illustrates a label facestock construction of the present invention.

Example 3

A 2 mil polyimide film having a PEDOT antistatic base coat prime layer is coated with the surface coating composition of Example 1 using reverse gravure application with gravure speeds of 23-40 fpm at a line speed of 25-30 feet per minute. After drying/curing, the dry coat weight of the surface coating on the polyimide film is <1 g/m$^2$.

The invention has been described with reference to the preferred embodiments. Modifications and alterations will occur to others upon a reading and understanding of the preceding detailed description. It is intended that the invention be construed as including all such modifications and alterations.

What is claimed is:

1. An electrostatic dissipative coating composition comprising:
   a phenoxy-epoxy resin system comprising from 40 parts by weight to 80 parts by weight of an epoxy resin and from 5 parts by weight to 20 parts by weight of a phenoxy resin;
   carbon nanotubes dispersed in the phenoxy-epoxy resin system;
   at least one isocyanate crosslinking agent; and
   at least one metal catalyst.

2. The electrostatic dissipative coating composition of claim 1, wherein the carbon nanotubes comprise 1 to 5% by weight based on the total weight of the phenoxy and epoxy resins in the coating composition.

3. The electrostatic dissipative coating composition of claim 1, further comprising an inorganic filler.

4. The electrostatic dissipative coating composition of claim 3, wherein the inorganic filler comprises titanium dioxide.

5. The electrostatic dissipative coating composition of claim 4, wherein the titanium dioxide comprises 30 to 50% by weight based on the total weight of the phenoxy and epoxy resins in the coating composition.

6. The electrostatic dissipative coating composition of claim 1, wherein the at least one isocyanate crosslinking agent is a blocked isocyanate.

7. The electrostatic dissipative coating composition of claim 1, further comprising at least one anionic surfactant.

8. The electrostatic dissipative coating composition of claim 1, further comprising at least one solvent.

9. An electrostatic dissipative label construction, comprising:
   a polymer film substrate having an upper surface and a lower surface; and
   an electrostatic dissipative coating layer overlying the upper surface and formed of an electrostatic dissipative coating composition comprising:

a phenoxy-epoxy resin system comprising from 40 parts by weight to 80 parts by weight of an epoxy resin and from 5 parts by weight to 20 parts of a phenoxy resin;

carbon nanotubes dispersed in the phenoxy-epoxy resin system;

at least one isocyanate crosslinking agent; and at least one metal catalyst.

10. The electrostatic dissipative label construction of claim 9, wherein the polymer film substrate comprises a polyimide film.

11. The electrostatic dissipative label construction of claim 9, further comprising an antistatic base coat layer disposed between the upper surface and the electrostatic dissipative coating layer.

12. The electrostatic dissipative label construction of claim 9, further comprising an adhesive layer underlying the lower surface of the polymer film substrate, the adhesive layer having an upper surface and a lower surface.

13. The electrostatic dissipative label construction of claim 12, wherein the adhesive is a pressure sensitive adhesive.

14. The electrostatic dissipative label construction of claim 12, further comprising a release liner in contact with the lower surface of the adhesive layer.

15. The electrostatic dissipative label construction of claim 9, wherein the carbon nanotubes comprise 1 to 5% by weight based on the total weight of the phenoxy and epoxy resins in the coating composition.

16. The electrostatic dissipative label construction of claim 9, wherein the electrostatic dissipative coating composition further comprises an inorganic filler.

17. The electrostatic dissipative label construction of claim 16, wherein the inorganic filler comprises titanium dioxide.

18. The electrostatic dissipative label construction of claim 17, wherein the titanium dioxide comprises 30 to 50% by weight based on the total weight of the phenoxy and epoxy resins in the coating composition.

19. The electrostatic dissipative label construction of claim 9, wherein the at least one isocyanate crosslinking agent is a blocked isocyanate.

20. The electrostatic dissipative label construction of claim 9, wherein the electrostatic dissipative coating composition further comprises at least one anionic surfactant.

21. The electrostatic dissipative label construction of claim 9, wherein the electrostatic dissipative coating composition further comprises at least one solvent.

22. The electrostatic dissipative label construction of claim 9, wherein the electrostatic dissipative coating layer has a surface adapted to carry printed information.

23. An electrostatic dissipative label facestock construction, comprising:

a polymer film substrate having an upper surface and a lower surface; and an electrostatic dissipative coating layer overlying the upper surface and formed of an electrostatic dissipative coating composition comprising:

a phenoxy-epoxy resin system comprising from 40 parts by weight to 80 parts by weight of an epoxy resin and from 5 parts by weight to 20 parts by weight of a phenoxy resin;

carbon nanotubes dispersed in the phenoxy-epoxy resin system;

at least one isocyanate crosslinking agent; and at least one metal catalyst;

said electrostatic dissipative coating layer having a surface adapted to carry printed information; and an antistatic base coat layer disposed between the upper surface and the electrostatic dissipative coating layer.

* * * * *